United States Patent
Lindblom

(10) Patent No.: US 9,609,961 B2
(45) Date of Patent: Apr. 4, 2017

(54) PORTABLE FOLDING DISPLAY

(71) Applicant: Streater LLC, Albert Lea, MN (US)

(72) Inventor: Thomas G. Lindblom, Claremont, MN (US)

(73) Assignee: Streater LLC, Albert Lea, MN (US)

( * ) Notice: Subject to any disclaimer, the term of this patent is extended or adjusted under 35 U.S.C. 154(b) by 80 days.

(21) Appl. No.: 14/847,419

(22) Filed: Sep. 8, 2015

(65) Prior Publication Data

US 2015/0374145 A1 Dec. 31, 2015

Related U.S. Application Data

(63) Continuation-in-part of application No. 14/170,057, filed on Jan. 31, 2014, now Pat. No. 9,131,788.

(51) Int. Cl.
*A47F 5/10* (2006.01)
*F16M 11/42* (2006.01)
*A47F 5/00* (2006.01)
*A47F 3/00* (2006.01)
*F16B 12/02* (2006.01)
*A47B 57/40* (2006.01)

(52) U.S. Cl.
CPC .............. *A47F 5/101* (2013.01); *A47B 57/40* (2013.01); *A47F 3/004* (2013.01); *A47F 5/0018* (2013.01); *A47F 5/10* (2013.01); *A47F 5/103* (2013.01); *F16B 12/02* (2013.01); *F16M 11/42* (2013.01)

(58) Field of Classification Search
CPC .. A47F 5/101; A47F 5/10; A47F 5/103; A47F 3/004; A47F 5/0018; A47B 57/40; F16B 12/02; F16M 11/42
USPC .................................................. 211/199, 187
See application file for complete search history.

(56) References Cited

U.S. PATENT DOCUMENTS

| | | | | |
|---|---|---|---|---|
| 3,463,218 A * | 8/1969 | Byrens | ..................... | A47G 5/00 160/135 |
| 3,830,374 A * | 8/1974 | Kassimir | ................. | A47F 5/103 211/1 |
| 4,018,340 A * | 4/1977 | Gold | ........................ | A47F 7/175 108/108 |
| 4,312,086 A * | 1/1982 | Bianco | .................... | A47B 83/00 108/108 |
| 4,508,231 A * | 4/1985 | Honickman | ........... | A47B 57/34 160/236 |
| 5,287,909 A * | 2/1994 | King | ........................ | A47G 5/00 160/135 |
| 5,431,761 A * | 7/1995 | Holztrager | ............ | A47F 5/0846 156/153 |

(Continued)

FOREIGN PATENT DOCUMENTS

FR 2784134 A1 * 4/2000 ............. A47F 5/105

*Primary Examiner* — Korie H Chan
(74) *Attorney, Agent, or Firm* — Thomas J. Nikolai; Nikolai & Mersereau, P.A.

(57) ABSTRACT

A portable foldable display includes a pair of end sections and a plurality of intermediate sections. The intermediate sections are joined together in a manner which permits the intermediate sections to be rotated with respect to each other for folding and unfolding of the display. The display also includes a plurality of shelves which may extend from the front or back of any of the intermediate sections and outwardly from the end sections. The vertical spacing between the shelves is adjustable. The display is on wheels to permit easy transport.

20 Claims, 8 Drawing Sheets

(56) References Cited

U.S. PATENT DOCUMENTS

| | | | | |
|---|---|---|---|---|
| 5,529,192 | A * | 6/1996 | Conen | A47F 5/0815 211/187 |
| 5,622,010 | A * | 4/1997 | Weber | A47F 5/0846 211/88.01 |
| 6,427,857 | B1 * | 8/2002 | Adams | A47F 5/10 211/162 |
| 6,574,837 | B2 * | 6/2003 | Jantschek | E04B 2/7431 16/371 |
| 7,213,632 | B1 * | 5/2007 | Goldstein | A47G 5/00 160/135 |
| 7,874,090 | B2 * | 1/2011 | Flagg | G09F 15/0068 116/63 P |
| 8,312,596 | B2 * | 11/2012 | Self | A47K 3/36 16/250 |
| 8,807,356 | B2 * | 8/2014 | Weigand | A47F 5/10 211/183 |
| 2007/0094846 | A1 * | 5/2007 | Ishida | E05D 3/122 16/354 |
| 2008/0178543 | A1 * | 7/2008 | Maas | E04B 2/7425 52/234 |
| 2009/0255638 | A1 * | 10/2009 | Hardt, II | E04B 2/7431 160/351 |
| 2011/0099921 | A1 * | 5/2011 | Fitzgerald | E04B 2/7425 52/127.1 |
| 2012/0241401 | A1 * | 9/2012 | Galey | A47F 5/0815 211/189 |
| 2013/0260362 | A1 * | 10/2013 | Melashenko | G09B 19/00 434/430 |

\* cited by examiner

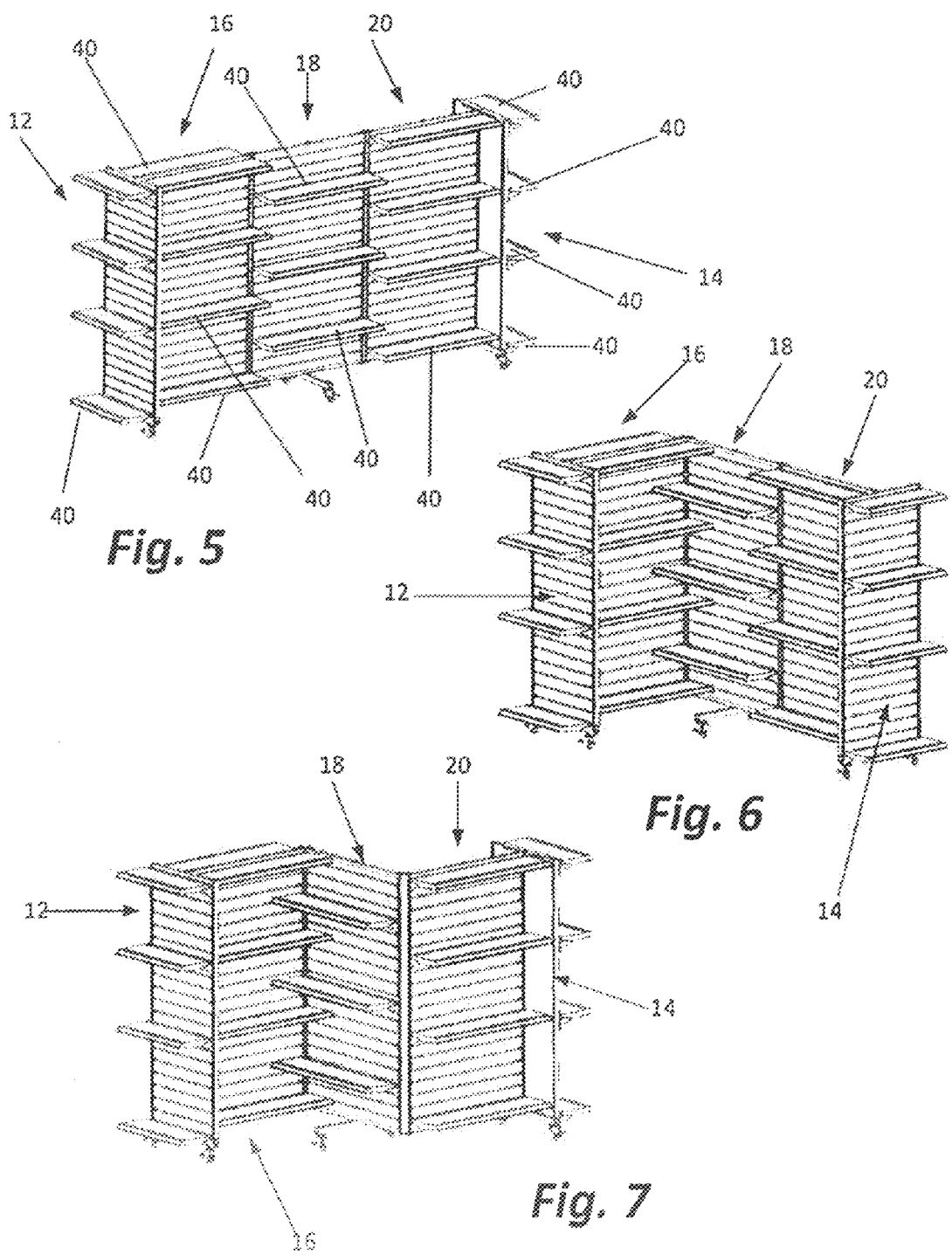

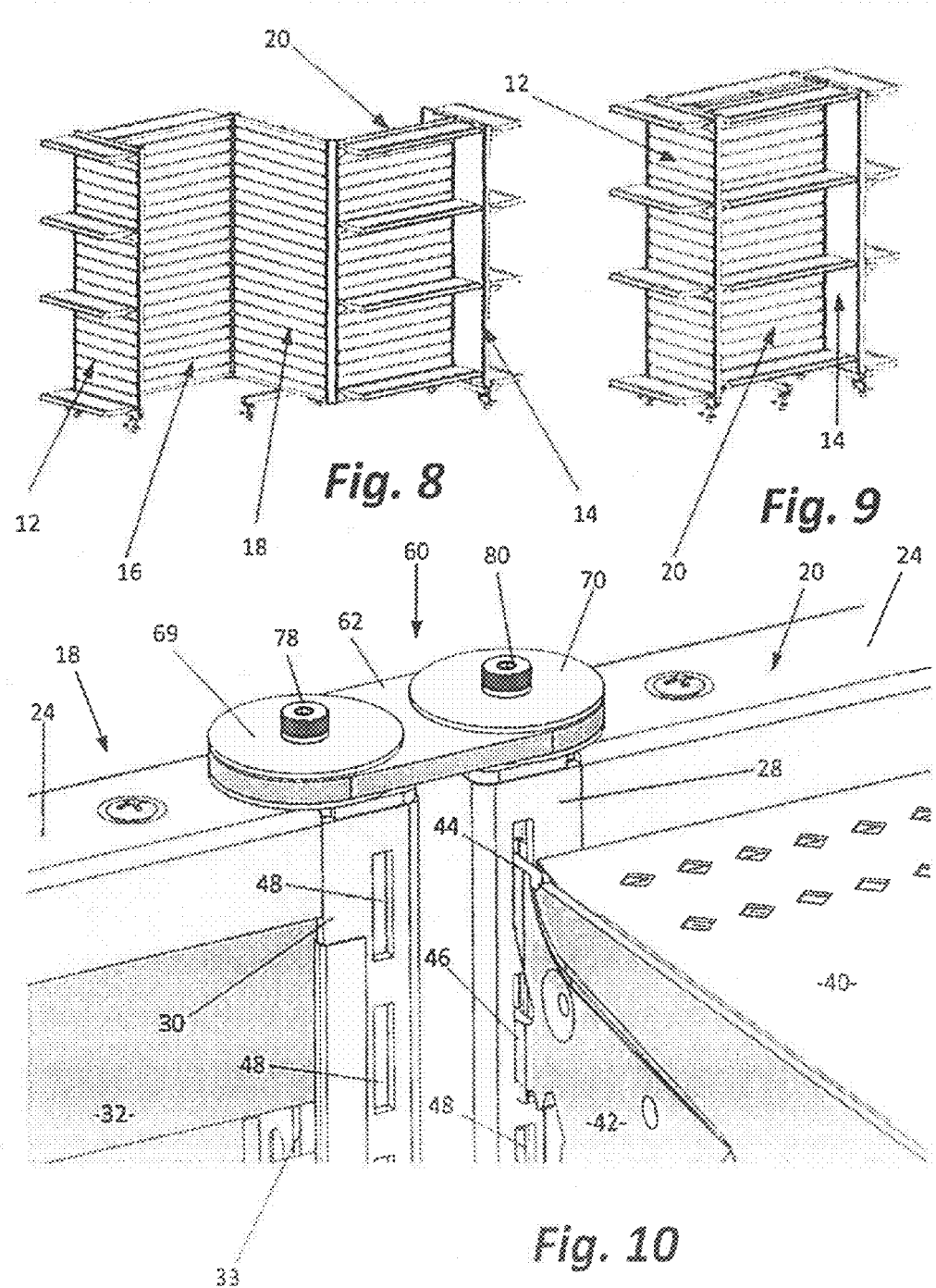

PORTABLE FOLDING DISPLAY

CROSS-REFERENCED TO RELATED APPLICATIONS

This application is a continuation-in-part of U.S. patent Ser. No. 14/170,057, filed Jan. 31, 2014.

STATEMENT REGARDING FEDERALLY SPONSORED RESEARCH OR DEVELOPMENT

Not applicable

BACKGROUND OF THE INVENTION

I. Field of the Invention

The present invention relates to gondola-type shelving often used to display items in retail locations. More specifically, the present invention relates to a portable folding display.

II. Related Art

Gondola-type shelving is used in retail stores throughout the world. Significant advantages of gondola-type shelving are that such shelving is durable, sturdy, relatively easy to assemble, and readily permits the vertical distance between the actual shelves to be adjusted. Most gondola-type shelving is, however, designed to be stationary rather than portable. Also, gondola-type shelving is typically designed to incorporate straight lines and right angles. This works well in a rectangular room or a rectangularly-shaped display area, but limits the aesthetic offerings available. Likewise, most gondola-style shelving units must be completely (or at least mostly) disassembled for storage or for moving a unit to a different location.

SUMMARY OF THE INVENTION

The present invention addresses the limitations of prior art gondola-type shelving systems by providing a portable folding display. The portable folding display further serves to support a plurality of shelves on either the front or back of the display or on both the front and back of the display as well as on the ends of the display.

More specifically, the portable folding display comprises first and second end sections and one or more intermediate sections. Each of the sections includes a frame comprising a top member, a bottom member and a pair of hollow vertical posts defined by a front wall, a back wall and opposing end walls. Each vertical post, like the support posts of a standard gondola shelving system, has a plurality of vertically arranged slots through a front wall and a back wall. The interior of the frame of each of the sections may be filled with a panel or left open as desired.

During assembly, a first of the intermediate sections is non-rotatably affixed to the first end section such that the first intermediate section extends perpendicularly from the first end section. A second intermediate section is affixed in this same fashion to the second end section. One or more additional intermediate sections are then placed between the first and second intermediate sections such that the sections are in end-to-end alignment. Top and bottom hinge assemblies are employed to couple each adjacent pair of intermediate sections together. The top and bottom hinges may each include a pair of plates having gear teeth which mesh together. This arrangement ensures that the tops and bottoms of the intermediate sections travel together as the hinge assemblies are employed to pivot the intermediate sections relative to each other. Thus, there is no twisting of the intermediate sections. Alternatively, the hinge assembly may comprise axle rods through the intermediate sections between top and bottom hinge plates to prevent twisting of the intermediate sections as they are folded and unfolded.

Wheel assemblies may also be provided. Each wheel assembly includes a bar and a pair of caster wheels coupled to the bottom of the bar. Each end section is provided with one of the wheel assemblies extending downwardly from the bottom member of the frame. To maximize stability, the caster wheel extends downwardly from the opposite ends of the bar and the top of the bar is arranged parallel to and in face-to-face registration with the underside of the bottom frame member of the associated end section. A third wheel assembly may be coupled to the bottom member of the frame of one of the intermediate sections so as to extend perpendicularly forward and rearward of the bottom frame member. Some or all of the caster wheels are preferably lockable.

This arrangement of the sections, the wheels and the hinges provides a display which is foldable and portable. The slots through the front and back walls of the vertical posts of a section's frame permit standard gondola-type shelves to be vertically arranged and mounted to the front and/or back of each intermediate section and to at least the outside of each of the end sections.

The present invention permits the entire assembly to be easily moved from place to place. The present invention permits the display to be folded for storage even with some of the shelves still in place. The present invention also allows the display to be arranged in a number of different aesthetically pleasing display configurations in addition to the intermediate sections extending along a straight line with the end panels extending perpendicularly to that line.

BRIEF DESCRIPTION OF THE DRAWINGS

The foregoing features, objects and advantages of the invention will become apparent to those skilled in the art from the following detailed description and with reference to the following drawings in which like numerals and the several views refer to corresponding parts.

FIGS. 5-7 are perspective views of various configurations of the display assembly of FIG. 1 with shelves attached to the end panels and the intermediate sections;

FIGS. 8-9 are perspective views showing only some of the shelves removed to permit the display assembly to be placed in the folded configuration;

FIG. 10 is a partial perspective view showing one of the hinges used to join the adjacent intermediate sections together;

DETAILED DESCRIPTION

Figure 1:
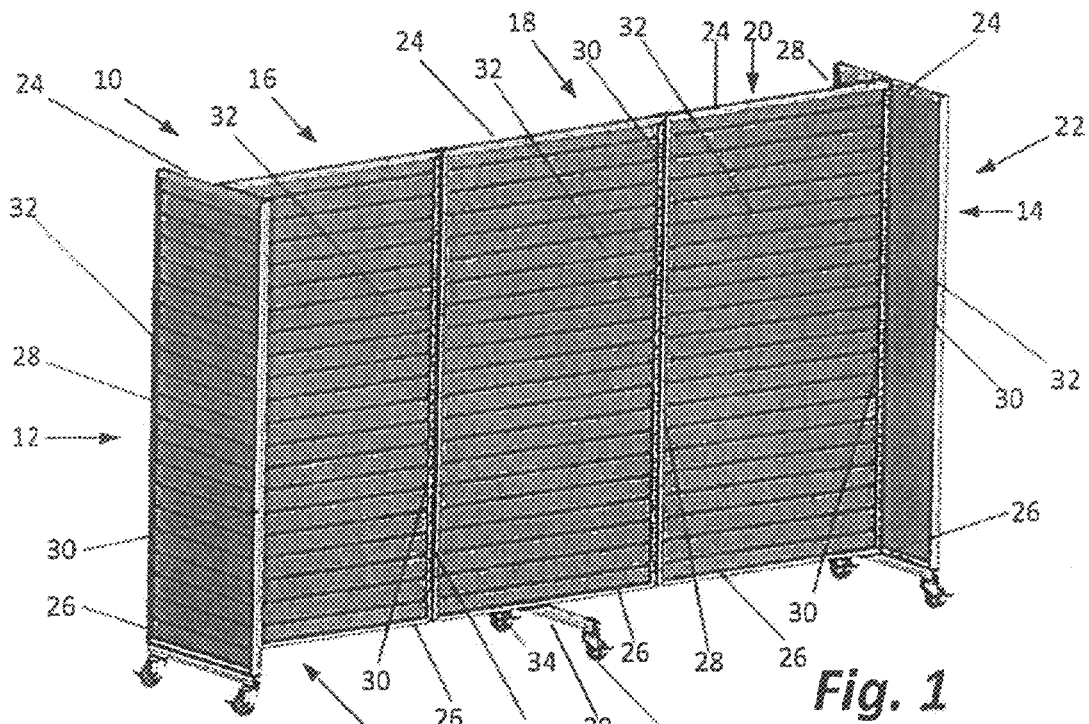
FIG. 1 is a perspective view of a display assembly in a straight configuration.
Figure 2:
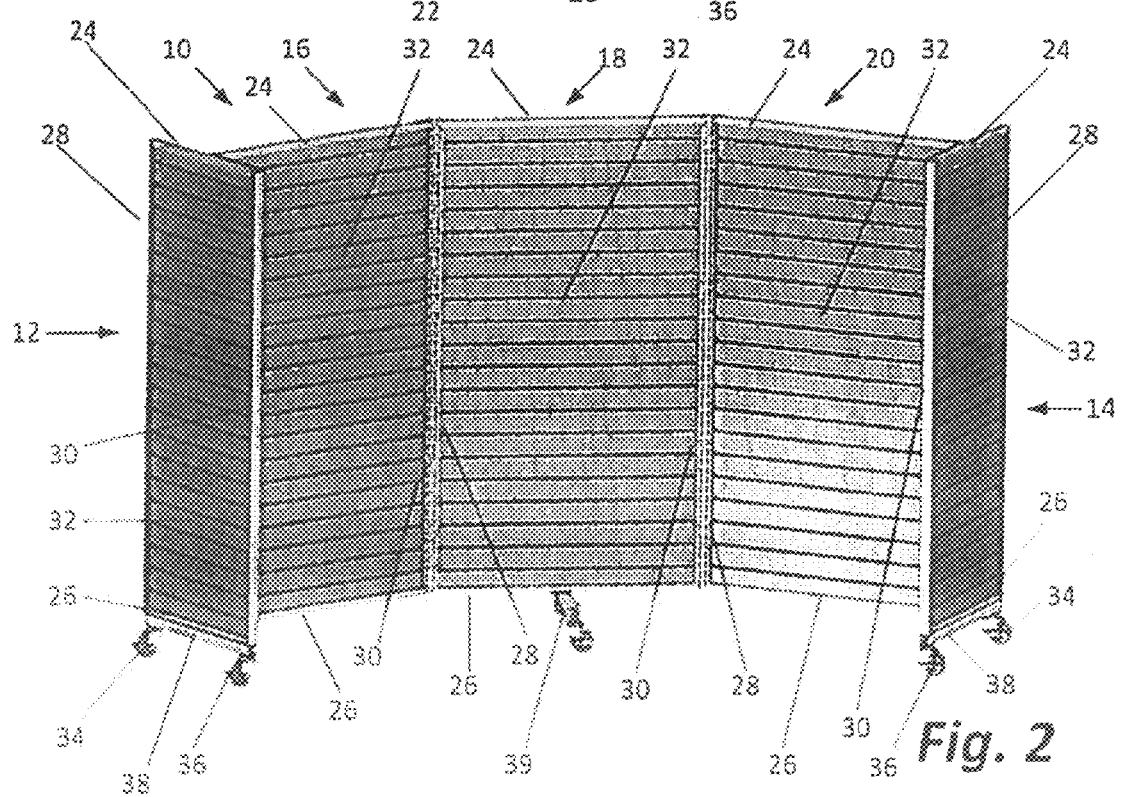
FIG. 2 is a perspective view of the display assembly of FIG. 1 arranged so the intermediate sections of the display assembly are at an angle with respect to each other different than 180°.
Figure 3:
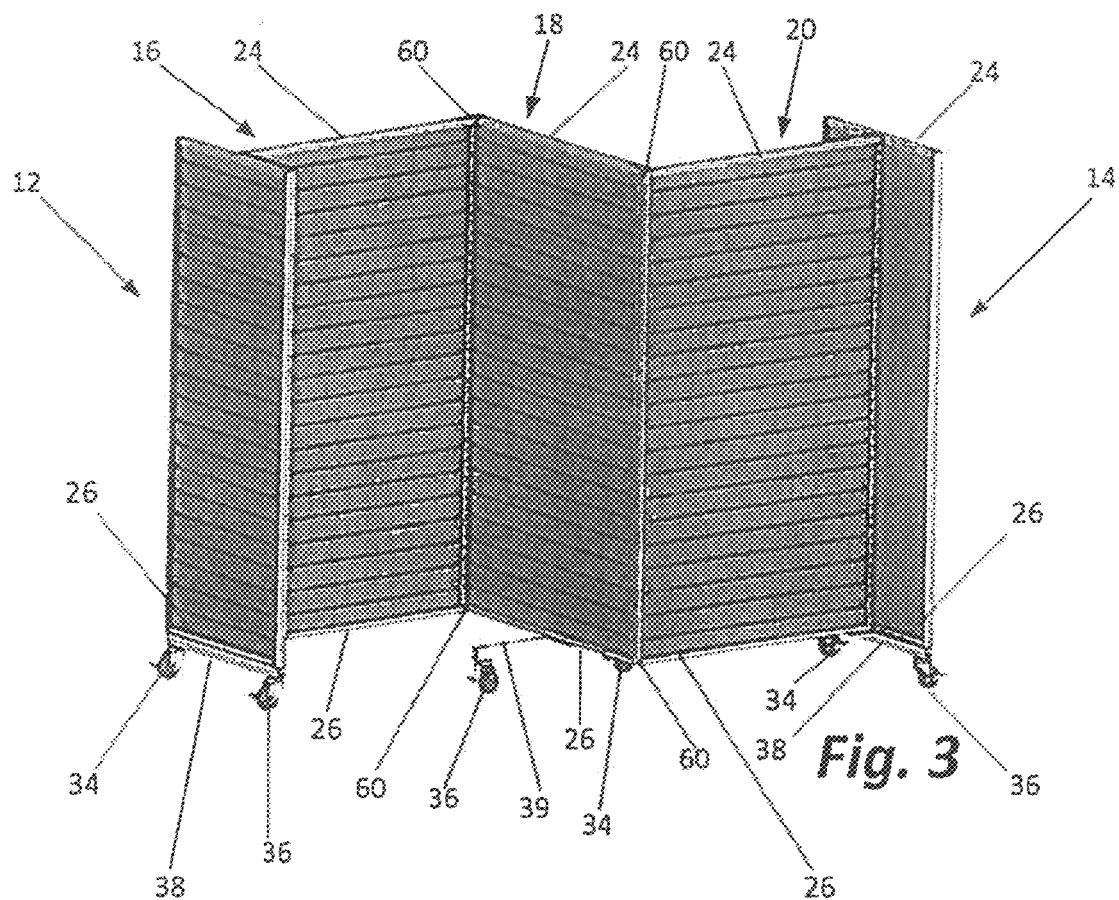
FIG. 3 is a perspective view of the display assembly of FIG. 1 arranged so the intermediate sections are each at a right angle with respect to any adjacent intermediate section.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivative thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

The display assembly 10 of a gondola-type shelving system is shown in FIGS. 1-4. The display assembly comprises end sections 12 and 14. Three intermediate sections 16, 18 and 20 are also shown. Each section has an outer frame 22 comprising a top member 24, a bottom member 26, and first and second vertical posts 28 and 30. The outer frame 22 of each section defines a rectangular opening that may be filled with a panel 82. The panel 32 may be in the form of a sheet of plywood, corkboard, pegboard or a decorative board. The panel 32 may be constructed of a single piece or a plurality of horizontally arranged pieces (as shown) or vertical pieces. In any event, the frame members are provided with channels 33 (see FIG. 10) to receive the edges of the panel such that the panel 32 is fixed to the frame 22. FIGS. 1-4 show the fronts of the intermediate sections. The backs of the intermediate sections are the mirror image thereof.

Mounted to the bottom member 26 of each of the two end sections 12 and 14 is a wheel assembly. Each wheel assembly includes a pair of castered, lockable wheel 34 and 36 which are coupled to the bottom of the opposite ends of a tubular bar 38 of rectangular cross-section. The top surface of bar 38, in turn, is coupled to the bottom surface of member 26. With respect to the end sections, the bar 38 is adapted to extend in a direction parallel to and is in face-to-face registration with the undersurface of bottom member 26. Examples of caster wheels suitable for use include stem casters and flush-mounted casters generally known in the art. Each caster may also be provided with a brake to selectively prevent rotation of the wheel.

Mounted to the center of the bottom frame member 26 of intermediate section 18 is another wheel assembly comprising a bar 39. This bar 39 is substantially the same as the bars 38 except it is adapted to extend perpendicularly from the underside of bottom frame member 26 in front of and in back of the intermediate section 18. Mounted to the bottom of bar 39 is another pair of castered, lockable wheels 34 and 36. The wheels 34 and 36 are mounted at opposite ends of the bars 38 and 39 to ensure stability of the display assembly. The locks on the wheels permit the display assembly to be selectively locked in place. By unlocking the wheels, the display assembly may be moved or folded or the angles between adjacent intermediate sections 16-20 adjusted.

Each section of the display assembly shown in FIGS. 1-4 is designed to support one or more shelves 40 which may be adjustably and vertically spaced along the height of each section 12-20 as shown in FIGS. 5-7. Shelves 40 may be mounted to, and project outwardly from, the end sections 12 and 14. Shelves 40 may also be mounted to and extend outward from the front and back of the intermediate sections 16, 18 and 20. The shelves 40 are standard gondola-type shelves which have brackets 42 at each end of the shelves. Each bracket has at least a pair of hooks 44 and 46 which mate with vertically spaced slots 48 in the front and back walls of each of the hollow vertical posts 28 and 30. See FIG. 10. As shown in FIGS. 5-7, a shelf 40 has a length sufficient to span the section such that a bracket 42, on one end of the gondola shelf 40, mates with slots 48 in post 28 and the bracket 42 on the opposite end of shelf 40 mates with slots 48 in post 30.

As illustrated in FIGS. 8 and 9, only some of the shelves 40 must be removed to permit folding of the display assembly. Specifically, the shelves need only be removed from the front of panel 16, the front and back of panel 18 and the back of panel 20 to permit folding of the display assembly as in FIG. 9.

Figure 11:
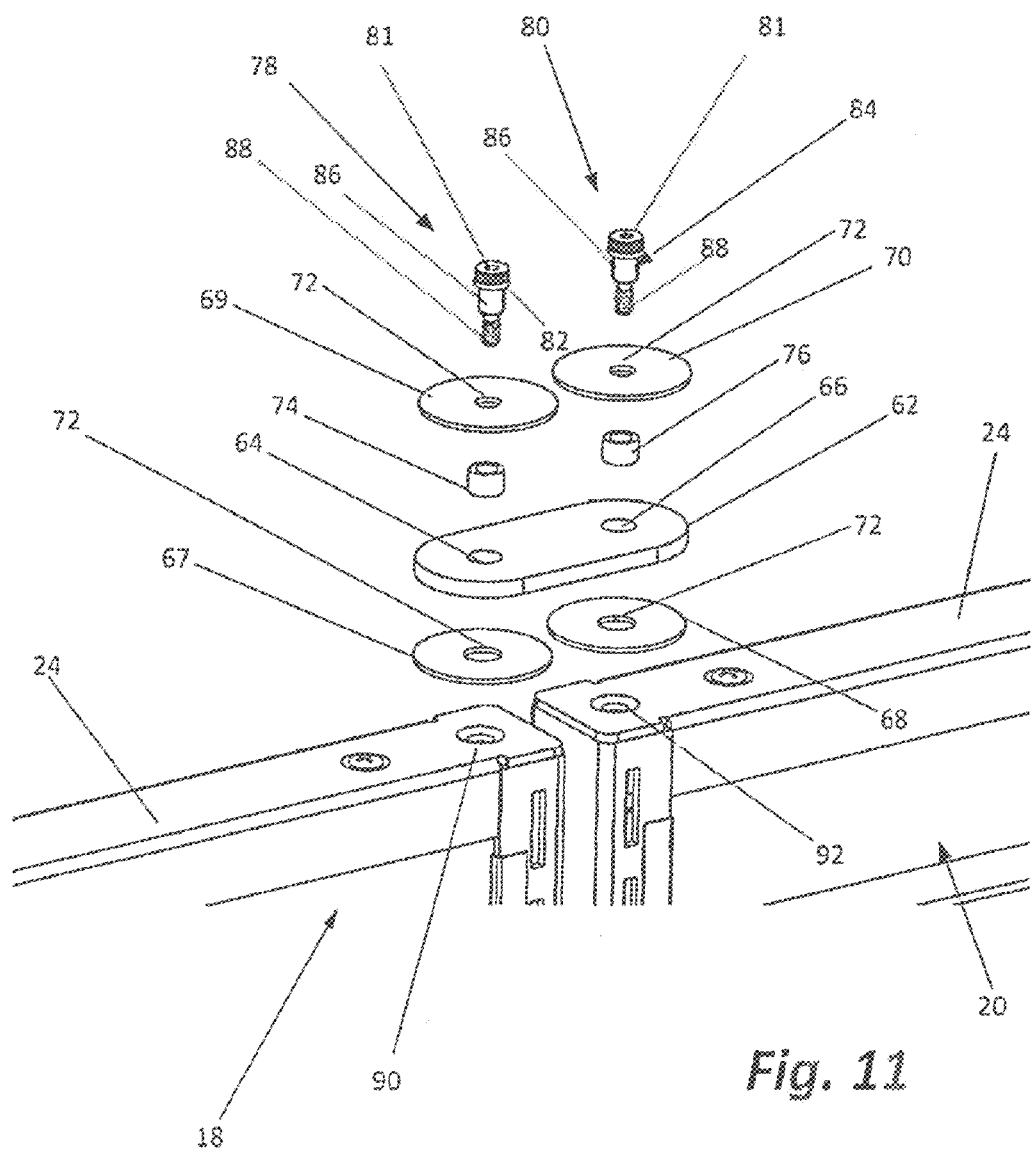
FIG. 11 is an exploded view of the hinge shown in FIG. 10.

Hinges 60 in FIG. 10 are used to couple the adjacent intermediate panels 16, 18 and 20 together so they may pivot with respect to each other as illustrated in FIGS. 10 and 11. A separate hinge 60 is located at (and connects) the tops and the bottoms of adjacent panels. More specifically, a top hinge 60 and a bottom hinge of the same construction couple panel 16 to panel 18. Two such hinges 60 also couple panels 18 and 20 together.

As seen in FIG. 11, each hinge 60 comprises a spacer plate 62 having a pair of holes 64 and 66 therethrough. Each hinge also includes four washers 67, 68, 69 and 70 each having a center hole 72 therethrough. Each hinge includes two cylindrical bushings 74 and 76. Each hinge also includes two shoulder bolts 78 and 80. Each of bolts 78 and 80 includes a head 81 above a flange 82. Extending below the flange 82 is a shoulder 84 having a wider non-threaded section 86 followed by a narrower threaded section 88.

A hinge 60 is coupled to two adjacent sections by aligning the disks, plates, and bushings over a threaded hole 90 in the top member and bottom members of the frame of one of the intermediate sections (e.g., 18) and a threaded hole 92 in the top member and bottom members of the frame of an adjacent section (e.g., 20). Specifically, hole 72 of washer 67 is aligned with threaded hole 90 and hole 72 of washer 68 is aligned with threaded hole 92. Next, the plate 62 is positioned so hole 64 is aligned with hole 90 and hole 66 is aligned with hole 92. The bushings 74 and 76 are then placed within holes 64 and 66, respectively. Next, hole 72 in washer 69 is aligned with hole 90 and hole 72 in washer 70 is aligned with hole 92. Finally, the threaded section 88 of bolt 78 is passed through disk 59, the plate 62 and disk 67 and then into hole 90. Likewise, the threaded section 88 of bolt 80 is passed through disk 70, plate 62, disk 68 and into hole 92. Rotation of the bolts 78 and 80 causes the bolt threads to mesh with the internal threads of any holes 90 and 92 respectively to couple the hinge 60 to the two sections (e.g., 16 and 18) and likewise couple the two sections together.

The dimensions of the spacer plate 62 permit the adjacent sections coupled by (and more specifically the distance between the holes through the spacer plate) a pair of hinges 60 to rotate nearly 360° with respect to each other about the top and bottom hinges 60 used to couple the sections together. The arrangement of the bushings 74 and 76 in the plate holes 64 and 66 and the unthreaded shoulder portions of the bolts 78 and 80 permit such rotation while maintaining a solid connection between the two adjacent sections.

Again, each pair of adjacent intermediate sections is coupled together by a pair of hinges 60. The connection between the end panels 12 and 14 and the adjacent intermediate panels 16 and 18 respectively is fixed.

One issue that may arise when folding and unfolding the intermediate sections is that the sections may twist out of the desired alignment. This issue may be addressed by providing hinge assemblies which include means for preventing such twisting. Examples of means for preventing such twisting are illustrated in FIGS. 12-16.

Figure 12:
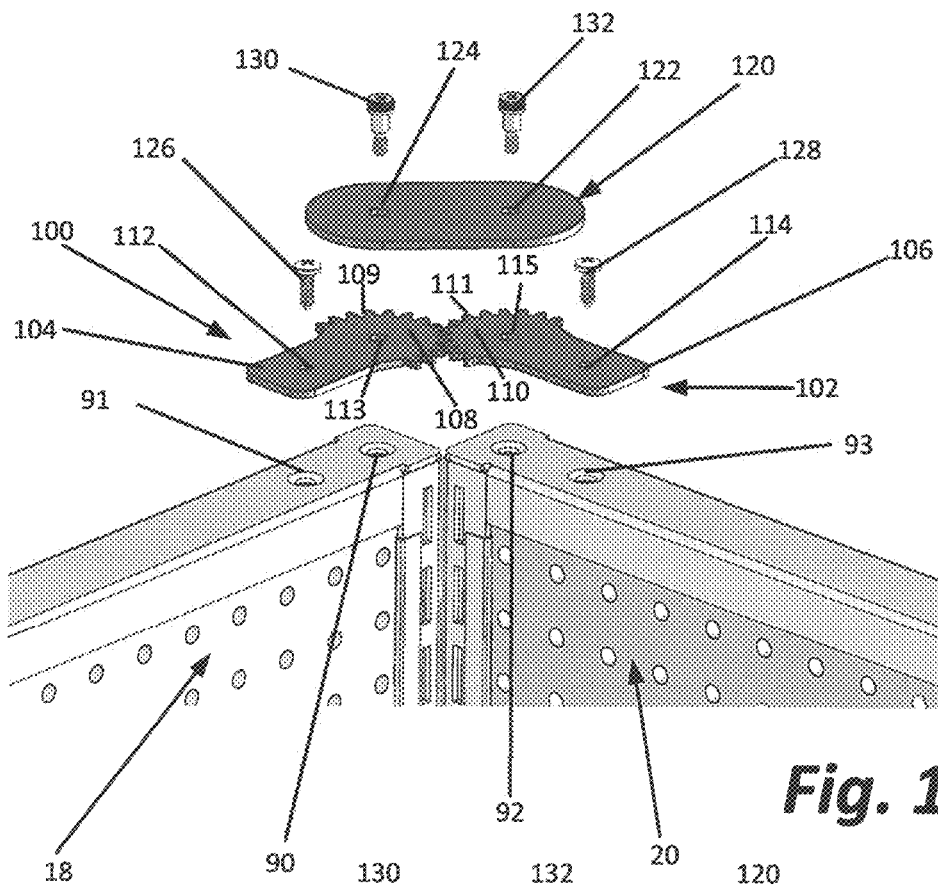
FIG. 12 is an exploded view of an alternative hinge arrangement.
Figure 13:
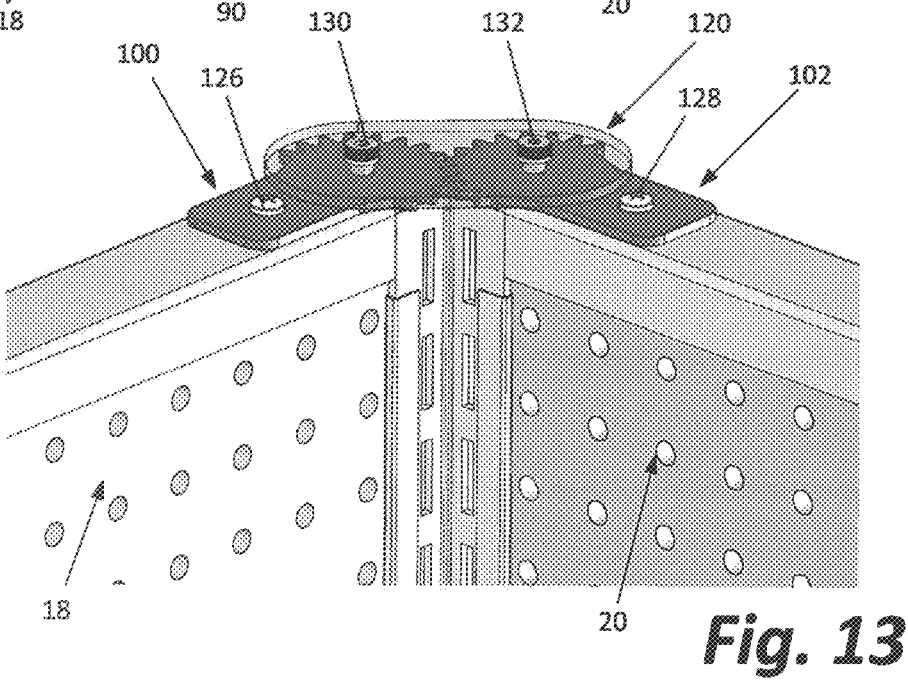
FIG. 13 is a perspective view of the alternative hinge arrangement of FIG. 12 when fully assembled.

The embodiment illustrated in FIGS. 12 and 13 comprises a pair of hinges which may be substituted for the hinges 60 shown in the other drawings discussed above. The hinges shown in FIGS. 12 and 13 comprises three plates 100, 102 and 120 and four screws 126, 128, 130 and 132.

The plates 100 and 102 each have flat top and bottom surfaces. The plates 100 and 102 each comprise a generally rectangular section 104/106 and a semi-circular head section 108/110. The head sections 108 and 110 each comprise a plurality of circumferential gear teeth 109/111 separated by spaces and, thus, resemble a sprocket. The gear teeth 109 of plate 100 are adapted to engage and mesh with the gear teeth 111 of plate 102. Plates 100 and 102 also have a pair of holes extending therethrough, holes 112 and 113 in the case of plate 100 and holes 114 and 115 in the case of plate 102.

Plate 120 also has flat top and bottom surfaces. Plate 120 also has a pair of holes 122 and 124 extending therethrough.

The holes of plates 100, 102 and 120 are adapted to be aligned with threaded holes 90-93 in adjacent intermediate sections (e.g., 18 and 20) as illustrated in FIGS. 12 and 13. The threaded screws 126, 128, 130 and 132 cooperate with the threaded holes to secure the plates in place. As such, the plates 100, 102 and 120 serve to pivotally couple the intermediate sections together and, thus, cooperate to act as a hinge.

More specifically, holes 112 and 113 of plate 100 are adapted to be aligned with the threaded holes 91 and 90 of intermediate section 18. The threaded end of screw 126 is then passed through hole 112 of plate 100 and screwed into the threaded hole 91 in intermediate section 18 to couple plate 100 to section 18. In an identical fashion, the threaded end of screw 126 is passed through hole 114 in plate 102 and screwed into threaded hole 93 of intermediate section 20 to couple plate 102 to section 20. When so fastened, the teeth 109 of plate 100 project past the edge of section 18 and the teeth 111 of plate 102 project past the edge of section 20. Also, hole 113 through plate 100 is aligned with threaded hole 90 in intermediate section 18 and hole 115 through plate 102 is aligned with the threaded hole 92 of intermediate section 20.

To complete the hinge assembly, the two sections 18 and 20 are brought together so that the gear teeth 109 of plate 100 mesh with the gear teeth 111 of plate 102. To hold the gear teeth 109 and 111 in meshed relation, plate 120 is employed. Plate 120 is positioned so that its hole 124 is aligned with hole 113 of plate 100 and threaded hole 90 of intermediate section 18. The threaded end of bolt 130 is then passed through holes 124 and 113 and screwed into threaded hole 90. Likewise, plate 120 is positioned so that its hole 122 is aligned with hole 115 in plate 102 and hole 92 in intermediate section 20. The threaded end of bolt 132 is then passed through holes 122 and 115 and screwed into hole 92. As illustrated, the plates 100, 102 and 120 and holes in the intermediate sections 18 and 20 and plates are adapted such that the intermediate sections 18 and 20 (and the plates 100 and 102) are able to rotate with respect to each other with the teeth 109 and 111 being held in meshed relation.

When the same type of hinge shown in FIGS. 12 and 13 is employed at the top and bottom of intermediate sections 18 and 20 to rotatably couple the intermediate sections together, the meshing of the gear teeth 109 and 111 serves to index and control rotation of the panels to prevent twisting of the intermediate sections 18 and 20 as they rotate relative to each other. Of course, various modifications may be made to the shapes and sizes of the plates 100, 102 and 120 and still receive these same benefits. Even the shape and size of the gear teeth 109 and 111 may be altered. What is important is that the plates 100 and 102 have gear teeth 109 and 111 that mesh and that the gear teeth are held in meshed relation as the intermediate sections 18 and 20 rotate relative to each other.

Figure 14:
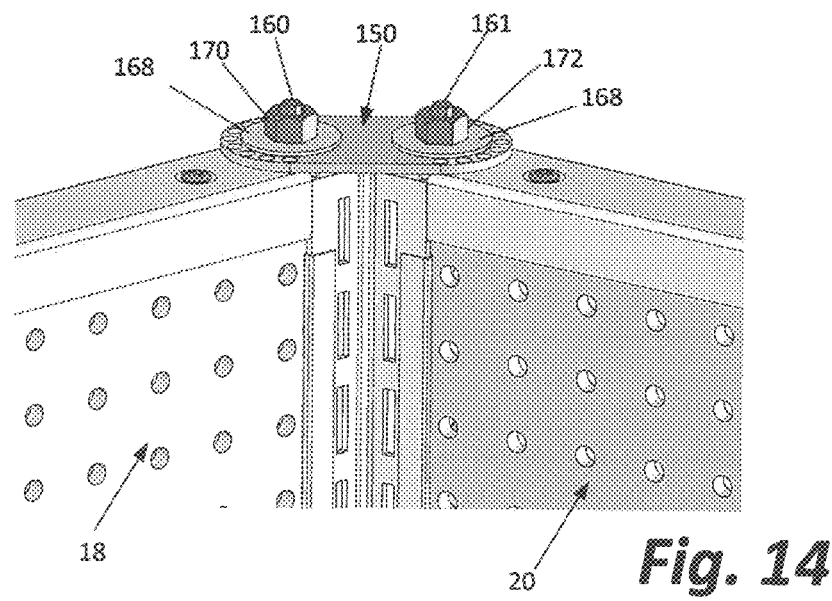
FIG. 14 is a perspective view of a second alternative hinge arrangement.
Figure 15:
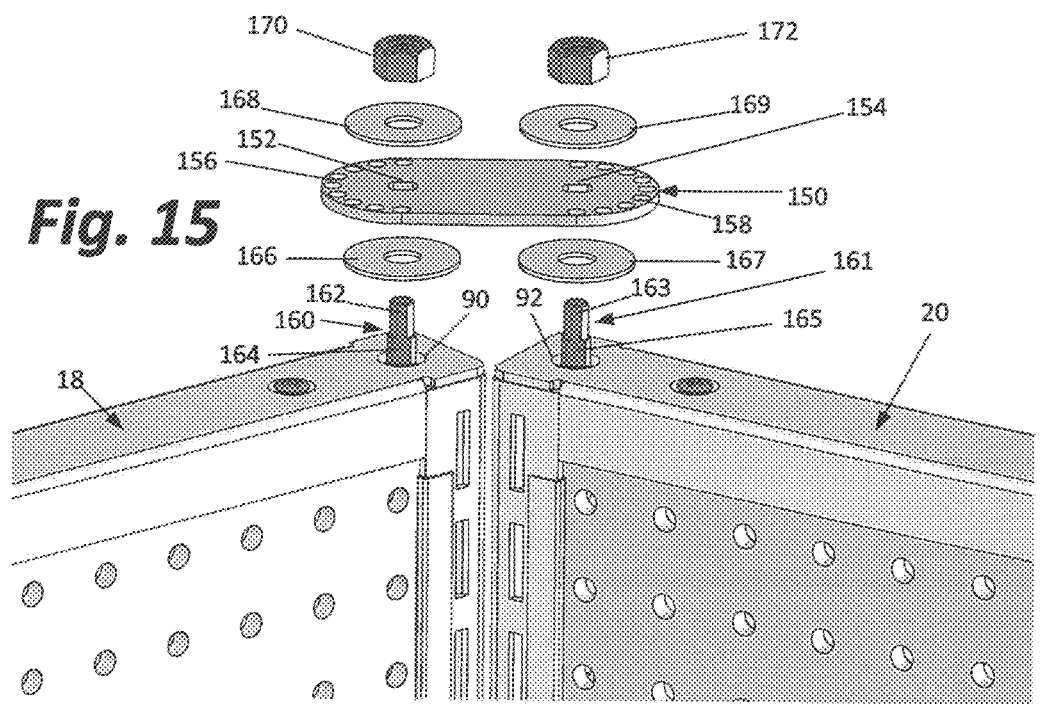
FIG. 15 is an exploded view of the hinge arrangement of FIG. 14.
Figure 16:
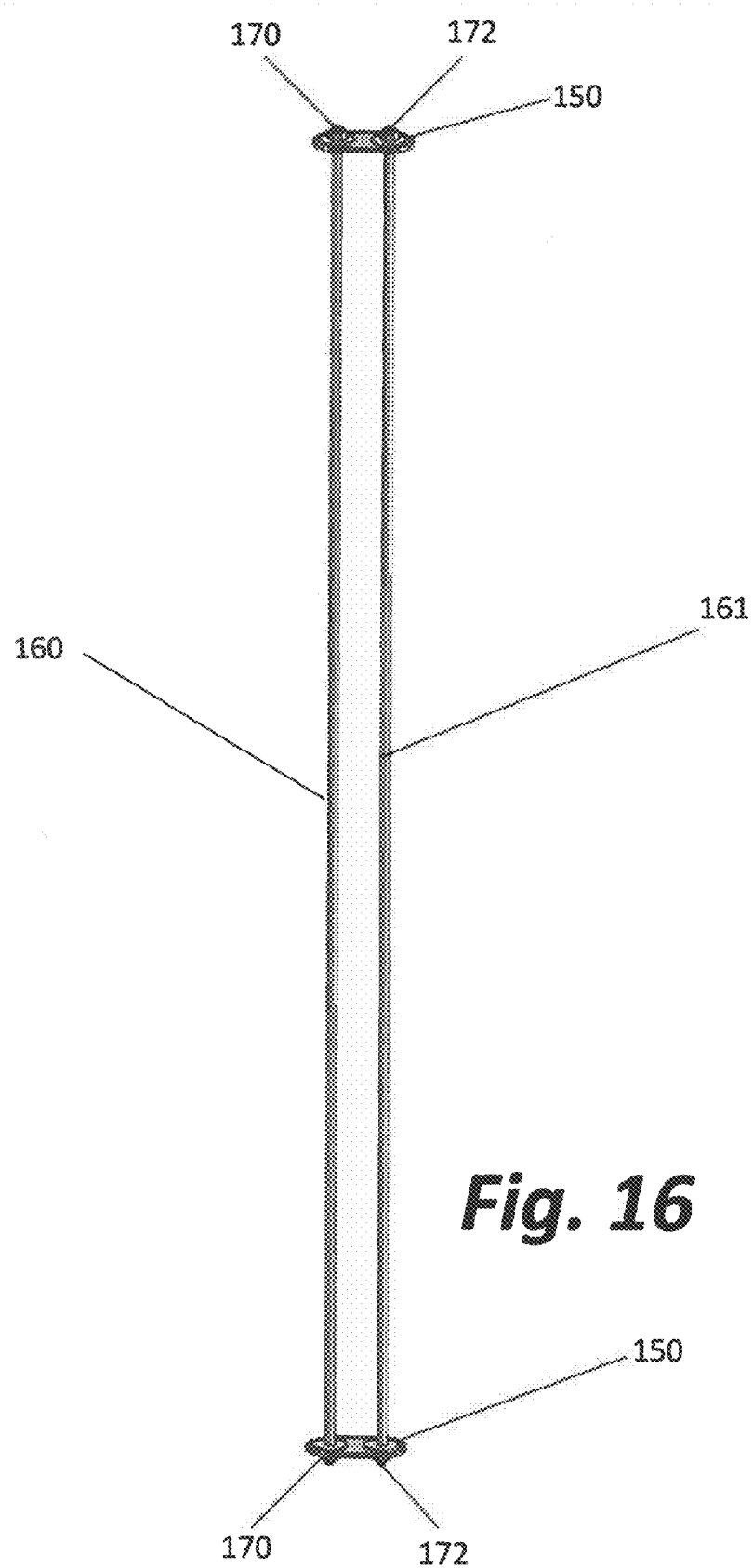
FIG. 16 shows a top and bottom hinge arrangement of the type shown in FIGS. 14 and 15 coupled to axle rods adapted to pass through intermediate sections of the folding display.

FIGS. 14-16 illustrate another embodiment in which the hinges include means other than gear teeth for preventing twisting of the intermediate sections as they are folded and unfolded. This embodiment employs two axle rods 160 and 161. Axle rod 160 passes through intermediate section 18 and has exposed ends extending through and out of holes 90 in the top and bottom of the intermediate section 18. The exposed ends of the axle rod 160 have a keyed section 164 and a threaded section 162. Likewise, axle rod 161 extends through intermediate section 20 and has exposed ends extending through and out of holes 92 in the top and bottom of intermediate section 20. The exposed ends of axle rod 161 have a keyed section 165 and a threaded section 163.

The hinge assembly at the top and bottom of intermediate sections 18 and 20 each also include four washers 166, 167, 168 and 169, two bolts 170 and 172 and a hinge plate 150. The hinge plate includes a pair of key holes 152 and 154. The key holes 152 and 154 are adapted to receive and engage the keyed sections 164 and 165 of the axle rods 160 and 161 to prevent rotation of the axle rods 160 and 161 relative to the top and bottom hinge plates 150. The hinge plate may also include two sets of indexing holes 156 and 158 to assist with alignment during assembly.

During assembly, washer 166 is placed over the exposed end of axle rod 160 and washer 167 is placed over the exposed end of axle rod 161. Next, the hinge plate 150 is placed on the axle rods 160 and 161 so that the key holes 152 and 154 engage the keyed portions 164 and 165 of the axle rods 160 and 161. A second washer is then placed over the exposed end of the axle rods 160 and 162, i.e., washer 168 over rod 160 and washer 169 over rod 161. The assembly is completed by attaching nut 170 to the threaded section 162 of axle rod 160 and nut 172 to the threaded section 163 of axle rod 161.

When the hinge assemblies shown FIGS. 14 and 15 are in place at the top and bottom ends of the axle rods 160 and 161, as illustrated in FIG. 16 with the axle rods extending through the intermediate sections 18 and 20, sections 18 and 20 are able to be folded and unfolded because they are able to rotate about their respective axle rods 160 and 161. However, the assembly, given the stiffness of axle rods 160 and 161, prevents the intermediate sections 18 and 20 from twisting during the folding and unfolding process.

Figure 4:
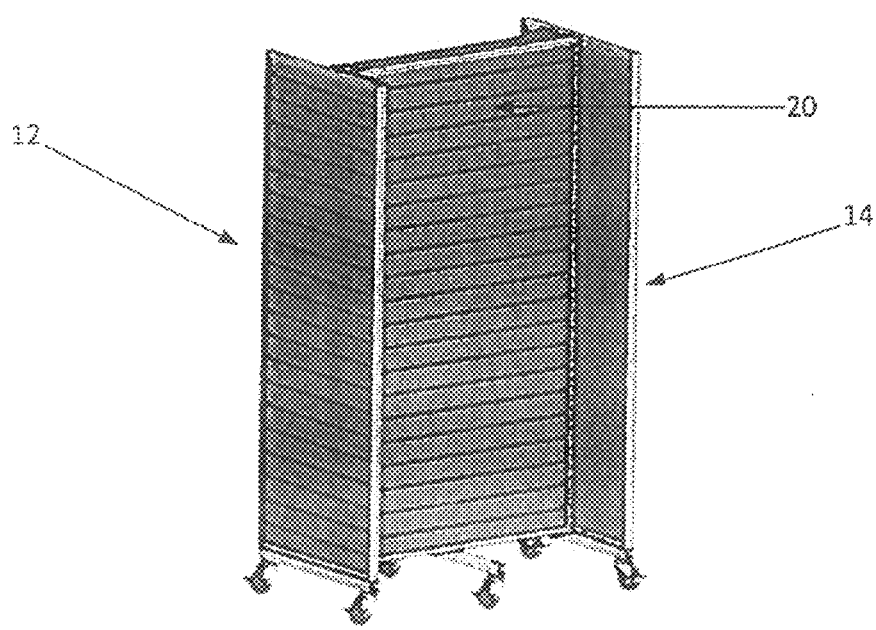
FIG. 4 is a perspective view of the display assembly of FIG. 1 in its folded configuration.

From the foregoing and the accompanying drawings, one skilled in the art should recognize that the display offers a variety of advantages. First, it sits in a stable fashion on the wheels of the wheel assemblies. Second, it can be manipulated into a variety of display configurations such as, for example, the configurations shown separately in FIGS. 1-4 and 6. Also, when the display is configured as shown in FIGS. 4 and 9, the display is compact and can easily be stored or transported from one site to another in this configuration. As also should be clear from the drawings, the various shelves 40 may extend outwardly from either of the two end sections or from the front and back of any of the intermediate sections. Further, only some of the shelves need be removed to prevent folding from, for example, the configuration shown in FIG. 5 to the configuration shown in FIG. 9. FIG. 8 shows an intermediate step with the necessary shelves removed. The vertical spacing between the shelves can be adjusted to accommodate different types of merchandise or to permit an intermediate section to be turned at a right angle to another intermediate section as sections 16 and 18 are shown, for example, in FIGS. 6 and 7. As shown in the drawings, all of the wheels are provided with a lock of the type typically used on a standard caster wheel. By locking the wheels, the display may be held in a specific configuration or position. All one needs to do to adjust the configuration or move the display is unlock some or all of the wheels. The hinge arrangements illustrated in FIGS. 10-13 permit complete rotation of the intermediate sections relative to each other such that, for example, the fronts of sections 16 and 18 may be placed in parallel, face-to-face registration with each other or rotated approximately 360° such that the backs of sections 16 and 18 are in parallel, face-to-face registration with respect to each other. The hinge arrangement shown in FIGS. 12 and 13 permit indexing of the top and bottom of the panels as they are rotated to hold the panels in the desired alignment during rotation to prevent twisting. The assembly shown in FIGS. 14-16 also prevents twisting of the sections 18 and 20.

One skilled in the art should also recognize that various modifications may be made from what is disclosed without deviating from the invention. For example, the bracket used on the shelves may include three hooks rather than two as is commonly the case with gondola-type shelving. Also, rather than providing a threaded hole 90 or 92, the hole may have a smooth interior wall in which case the threaded section 88 of the bolts 78 and 80 will simply be coupled to a nut, and perhaps a lock washer, located beneath the top member 24 of the associated frame. What is important is that a pair of hinges used to couple two sections together do so in a secure manner, permit rotation of the two sections relative to each other and provide a spacing between the two sections sufficient to permit such rotation to occur.

The foregoing description is intended to explain the various features and advantages, but is not intended to be limiting. The scope of the invention is defined by the following claims which are also intended to cover a reasonable range of equivalents.

What is claimed is:

1. A portable foldable display assembly comprising:
   (a) first and second end sections each having an outside surface and an inside surface surrounded by a frame comprising a top member, a bottom member and a pair of hollow vertical posts having an outside wall and a plurality of vertically arranged slots through the outside wall;
   (b) first, second and third intermediate sections, each having a front and a back and each including a frame comprising a top member, a bottom member and a pair of hollow vertical posts having front and back walls and a plurality of vertically arranged slots through the front and back walls, wherein one end of said first intermediate section is adapted to be coupled to the first end section so that the first intermediate section extends perpendicularly from the inside of the first end section and the third intermediate section is adapted to be coupled to the second end section so that the third intermediate section extends perpendicularly from the inside of the second end section;
   (c) a first pair of top and bottom hinge assemblies for pivotally coupling the top and bottom members of the second intermediate section to the top and bottom members of the first intermediate section such that the first pair of top and bottom hinge assemblies are further adapted to permit the first intermediate section to be rotated relative the second intermediate section between a first position in which the back of the first intermediate section is parallel to and in face-to-face registration with the back of the second intermediate section and a second position in which the front of the first intermediate section is parallel to and in face-to-face registration with the front of the second intermediate section; and
   (d) a second pair of top and bottom hinge assemblies for pivotally coupling the top and bottom members of the second intermediate section to the top and bottom members of the third intermediate section such that the second pair of top and bottom hinge assemblies are further adapted to permit the third intermediate section to be rotated relative the second intermediate section between a first position in which the back of the third intermediate section is parallel to and in face-to-face registration with the back of the second intermediate section and a second position in which the front of the third intermediate section is parallel to and in face-to-face registration with the front of the second intermediate section; and wherein the hinge assemblies comprise means for preventing twisting of the intermediate sections as they are rotated relative to each other.

2. The portable foldable display assembly of claim 1 and further including at least three wheel assemblies, each wheel assembly including a bar having a top surface and bottom surface with a pair of caster wheels coupled to the bottom surface of the bar proximate opposite ends of the bar, a first of the wheel assemblies adapted to be coupled to the bottom member of the frame of the first end section so that the top surface of the bar of the first of the wheel assemblies is in face-to-face registration with the bottom member of the frame of the first end section and extends parallel to the bottom member of the frame of the first end section, a second of the wheel assemblies adapted to be coupled to the bottom member of the frame of the second end section so that the top surface of the bar of the second of the wheel assemblies is in face-to-face registration with the bottom member of the frame of the second end section and extends parallel to the bottom member of the frame of the second end section, and a third of the wheel assemblies adapted to be coupled to the bottom member of the frame of the second intermediate section so that the bar of the third of the wheel assemblies extends forward and backward from the bottom member of the frame of the second intermediate section in a direction perpendicular to the bottom member of the frame of the second intermediate section.

3. The portable foldable display assembly of claim 1 further comprising a plurality of shelves adapted to be couple to the vertical support posts of at least one of the end sections and extend outwardly from the outside of said at least one of the end sections.

4. The portable foldable display assembly of claim 3 wherein each of said shelves include a bracket comprising first and second hooks adapted to mate with the vertically arranged slots of one of the hollow vertical posts of said at least one of the end sections.

5. The portable foldable display assembly of claim 1 further comprising a plurality of shelves, each adapted to be couple to the vertical support posts of at least one of the intermediate sections and extend outwardly from the front or back of said at least one of the intermediate sections.

6. The portable foldable display assembly of claim 5 wherein each of said shelves include a bracket comprising first and second hooks adapted to mate with the vertically arranged slots of one of the hollow vertical posts of said at least one of the intermediate sections.

7. The portable foldable display assembly of claim 1 wherein the means for preventing twisting comprises each of said hinges including a first plate having a first set of circumferential teeth, a second plate having a second set of circumferential teeth, and a third plate adapted to join the first plate to the second plate in a manner that permits the first and second plates to be rotated with respect to each other and holds said first set of teeth and said second set of teeth in meshed together relation as the first and second plates are rotated with respect to each other.

8. The portable foldable display assembly of claim 1 wherein the means for preventing twisting comprises a first rod having a top end and a bottom end, extending through a first of the intermediate sections, and a second rod having a top end and a bottom end extending through a second of the intermediate sections, said top ends of said rods coupled to a top hinge plate and the bottom ends of said first and second rods coupled to a bottom hinge plate.

9. The portable foldable display of claim 2 wherein at least some of the caster wheels are lockable.

10. The portable foldable display of claim 1 wherein said hinge assemblies are adapted to permit the display to be folded so that the front of the first intermediate section is in face-to-face registration and parallel to the front of the second intermediate section and the back of the third intermediate section is in face-to face registration with and parallel to the back of the second intermediate section.

11. The portable fordable display of claim 1 wherein at least one of the intermediate sections further comprises a rectangular panel having at least one edge.

12. The portable foldable display of claim 11 wherein the frame of said at least one of the intermediate sections includes a channel for receiving at least one edge of the panel.

13. A portable foldable display assembly comprising:
(a) at least three rectangular intermediate sections, each having a front and a back and extending from a first vertical end edge to a second vertical end edge, each of the three intermediate sections including a frame comprising a top member, a bottom member and a pair of hollow vertical posts having front and back walls with a plurality of vertically arranged slots formed through the front and back walls, said at least three intermediate sections arranged end to end from a first intermediate section to a last intermediate section;
(b) a first end section having an outside and an inside and a frame comprising a top member, a bottom member and a pair of hollow vertical posts having an outside wall and a plurality of vertically arranged slots through the outside wall, said first end section adapted to be coupled to the first vertical end edge of the first of the at least three intermediate sections such that the first end section is perpendicular to the first intermediate section and extends beyond the front and back of the first intermediate section;
(c) a second end section having an outside and an inside and a frame comprising a top member, a bottom member and a pair of hollow vertical posts having an outside wall and a plurality of vertically arranged slots through the outside wall, said second end section adapted to be coupled to the second vertical end edge of the last of the at least three intermediate sections such that the second end section is perpendicular to the last intermediate section and extends beyond the front and back of the last intermediate section;
(d) a first pair of top and bottom hinge assemblies for pivotally coupling the second vertical end edge of one of the at least three intermediate sections to the first vertical end edge of another of the at least three intermediate sections, each hinge assembly of the first pair of top and bottom hinge assemblies adapted to permit said one of the at least three intermediate sections to be rotated relative said another of the at least three intermediate sections between a first position in which the back of said one of the at least three intermediate sections is parallel to and in face-to-face registration with the back of said another of the at least three intermediate sections and a second position in which the front of said one of the at least three intermediate sections is parallel to and in face-to-face registration with the front of said another of the at least three intermediate sections, said first pair of top and bottom hinge assemblies further including means for preventing twisting of said one of the at least three intermediate sections and said another of the at least three intermediate sections as they are rotated relative to each other; and
(e) at least three wheel assemblies, each wheel assembly including a bar having a top surface and bottom surface and a pair of caster wheels coupled to the bottom surface of the bar proximate opposite ends of the bar, a first of the wheel assemblies adapted to be coupled to the bottom member of the frame of the first end section so that the top surface of the bar of the first of the wheel assemblies is in face-to-face registration with the bottom member of the frame of the first end section and extends parallel to the bottom member of the frame of the first end section, a second of the wheel assemblies adapted to be coupled to the bottom member of the frame of the second end section so that the top surface of the bar of the first of the wheel assemblies is in face-to-face registration with the bottom member of the frame of the second end section and extends parallel to the bottom member of the frame of the second end section, and a third of the wheel assemblies adapted to be coupled to the bottom member of the frame of any one of the intermediate sections so that the bar of the third of the wheel assemblies extends forward and backward from the bottom member of said any one of the intermediate sections in a direction perpendicular to the bottom member of the frame of said any one of the intermediate sections.

14. The portable foldable display assembly of claim 13 further comprising a plurality of shelves adapted to be couple to the vertical support posts of at least one of the end sections and extend outwardly from said at least one of the end sections.

15. The portable foldable display assembly of claim 14 wherein each of said shelves include a bracket comprising first and second hooks adapted to mate with the vertically arranged slots of one of the hollow vertical posts of said at least one of the end sections.

16. The portable foldable display assembly of claim 13 further comprising a plurality of shelves, each adapted to be couple to the vertical support posts of at least one of the intermediate sections and extend outwardly from the front or back of said at least one of the intermediate sections.

17. The portable foldable display assembly of claim 16 wherein each of said shelves include a bracket comprising first and second hooks adapted to mate with the vertically arranged slots of one of the hollow vertical posts of said at least one of the intermediate sections.

18. The portable foldable display assembly of claim 13 wherein means for preventing twisting of said one of the at least three intermediate sections and said another of the at least three intermediate sections as they are rotated relative to each other includes each hinge having a first plate with a first set of teeth, a second plate with a second set of teeth, and a third plate adapted to couple the first plate and the second plate together so that the first and second plates are rotatable with respect to each other and the first set of teeth meshes with the second set of teeth as the first plate and second plate are rotated relative to each other.

19. The portable foldable display assembly of claim 13 wherein means for preventing twisting of said one of the at least three intermediate sections and said another of the at least three intermediate sections as they are rotated relative to each other includes a first rod having a top end and a bottom end, passing through a first of the intermediate sections, and a second rod having a top end and a bottom end, passing through a second of the intermediate sections, said top ends of said first and second rods coupled to, a top hinge plate and the bottom ends of said first and second rods coupled to a bottom hinge plate.

20. The portable foldable display of claim 13 wherein at least some of the caster wheels are lockable.

* * * * *